US007123588B2

United States Patent
Mitra et al.

(10) Patent No.: US 7,123,588 B2
(45) Date of Patent: Oct. 17, 2006

(54) DECISION SUPPORT MECHANISMS FOR BANDWIDTH COMMERCE IN COMMUNICATION NETWORKS

(75) Inventors: Debasis Mitra, Summit, NJ (US);
Qiong Wang, Summit, NJ (US);
Kajamalai Gopalaswamy Ramakrishnan, Nashua, NH (US)

(73) Assignee: Lucent Technologies Inc., Murray Hill, NJ (US)

( * ) Notice: Subject to any disclaimer, the term of this patent is extended or adjusted under 35 U.S.C. 154(b) by 945 days.

(21) Appl. No.: 10/163,140

(22) Filed: Jun. 4, 2002

(65) Prior Publication Data

US 2003/0035429 A1 Feb. 20, 2003

Related U.S. Application Data

(60) Provisional application No. 60/295,614, filed on Jun. 4, 2001.

(51) Int. Cl.
*H04L 12/28* (2006.01)
*H04L 12/56* (2006.01)
*G06F 15/173* (2006.01)

(52) U.S. Cl. ............ 370/238; 370/400; 370/477; 709/226

(58) Field of Classification Search ........ 370/230–238, 370/252–253, 392–395, 400–468, 477; 709/224–229, 709/235–240; 705/37–38, 52–63
See application file for complete search history.

(56) References Cited

U.S. PATENT DOCUMENTS

| 5,838,663 | A  | * | 11/1998 | Elwalid et al. | 370/233 |
|---|---|---|---|---|---|
| 5,854,903 | A  | * | 12/1998 | Morrison et al. | 709/249 |
| 6,069,894 | A  | * | 5/2000 | Holender et al. | 370/397 |
| 6,331,986 | B1 | * | 12/2001 | Mitra et al. | 370/468 |
| 6,584,071 | B1 | * | 6/2003 | Kodialam et al. | 370/238 |
| 6,594,268 | B1 | * | 7/2003 | Aukia et al. | 370/400 |
| 6,721,270 | B1 | * | 4/2004 | Mitra et al. | 370/230 |
| 6,877,035 | B1 | * | 4/2005 | Shahabuddin et al. | 709/226 |
| 6,954,739 | B1 | * | 10/2005 | Bouillet et al. | 705/63 |
| 2002/0073013 | A1 | * | 6/2002 | Haddad | 705/37 |
| 2003/0208433 | A1 | * | 11/2003 | Haddad et al. | 705/37 |

* cited by examiner

*Primary Examiner*—Man U. Phan

(57) ABSTRACT

A method is provided for a dynamic optimization of network resource allocation on the part of a network service provider. In particular, the method of the invention provides an analytical framework for a determination by network service providers of an optimal resource allocation among links in a service provider's own network and links obtained from other network service providers. The analytical framework of the invention also incorporates, as a parameter, the provision of link capacity to other network service providers in the determination of an optimal resource allocation. In a preferred embodiment of the invention, such an optimal resource allocation is determined in respect to revenue maximization for the network service provider.

10 Claims, 3 Drawing Sheets

DECISION SUPPORT MECHANISMS FOR BANDWIDTH COMMERCE IN COMMUNICATION NETWORKS

RELATED APPLICATION

The invention is related to US Provisional Application No.60/295,614, filed on Jun. 4,2001, entitled METHOD OF TRAFFIC ENGINEERING FOR BANDWIDTH TRADING IN COMMUNICATION NETWORKS, the subject matter thereof being fully incorporated by reference herein.

FIELD OF THE INVENTION

The invention relates generally to network resource allocation methods, and particularly to the allocation of network capacity in a manner to optimize network revenue.

BACKGROUND OF THE INVENTION

Modem communication networks are typically comprised of a group of switches, which are referred to as nodes, and a plurality of transmission links that interconnect the nodes. The nodes serve both to provide user access to the network and to provide means for routing data transmitted across the network. The transmission links that interconnect these nodes carry the communication signals, and may comprise one or more different types of communications media such as wire, cable, radio, satellite or fiber optic communications links.

For a large geographical area, such as the contiguous United States, the total communication network infrastructure is usually an aggregate of a number of communication networks installed by individual network service providers that are interconnected at various node points. In many cases, a given network service provider will find it necessary (in order to meet a user requirement) to establish a connection between a node on its network and one or more nodes on a network of another network service provider. While interconnection arrangements between network service providers to facilitate such inter-network connections are known, they are generally based on long-term contractual arrangements and seldom result in an optimal allocation of network resources among the interconnecting network service providers.

SUMMARY OF THE INVENTION

A method is provided for a dynamic optimization of network resource allocation on the part of a network service provider. In particular, the method of the invention provides an analytical framework for a determination by network service providers of an optimal resource allocation among links in a service provider's own network and links obtained from other network service providers. The analytical framework of the invention may also incorporate, as a parameter, the provision of link capacity to other network service providers in the determination of an optimal resource allocation. In a preferred embodiment of the invention, such an optimal resource allocation is determined in respect to revenue maximization for the network service provider.

The analytical framework of the invention includes, as inputs: (1) a listing of network links, both owned and "tradable" to/from other networks, available for allocation; (2) spot prices for capacity on such links; and (3) statistical distributions that describe traffic forecast between pairs of nodes. The traffic-forecast data provides a demand parameter, and the statistical distributions provide a measure of uncertainty, or risk, in the predicted demand. From these inputs, the analytical framework of the invention provides to the network service provider an essentially real-time determination of an optimal amount of capacity to buy or sell on a given network link.

DETAILED DESCRIPTION

Figure 1:
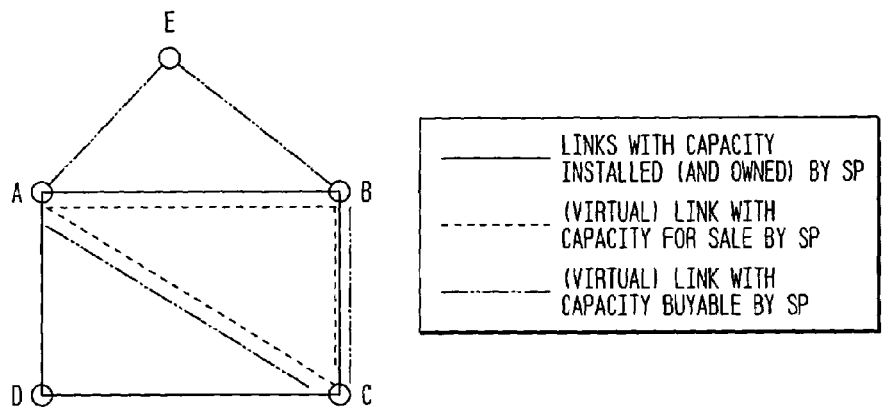
FIG. 1 provides a schematic depiction of an extended network environment according to the method of the invention.

In the predominant network paradigm of the existing art, network service providers have built their own network infrastructures to serve their end-user customers, mainly for voice traffic. Traffic demand is estimated based on judgment and experience, and capacities are periodically expanded to keep pace with increases in demand. Moreover, regulatory requirements have generally made it imperative for the network service provider to build enough redundancy into its network to accommodate a worst-case scenario. With this network paradigm, however, optimal scaling of capacity to demand is not a primary objective, and is seldom realized.

In the last decade or so, however, competition has substantially replaced regulation as the dominant force in the communication-services marketplace. In this new market environment, service providers face increasing competitive pressures to reduce network costs, particularly through more efficient utilization of network capacity, or bandwidth. At the same time, the network service providers are steering into largely uncharted waters of supporting emerging data service applications, for which demand, and correspondingly revenue, is considerably more uncertain than for traditional voice service. In such a competitive market environment, it becomes essential that network capacity be kept closely in balance with traffic demand. In such a capacity/demand network model, contentions for network resources are bound to occur, and short-term imbalances between available network capacity and traffic demand need to be addressed.

A promising recent development is that "spot" markets for communication services are beginning to evolve, following the development of such markets in the energy sector, and ultimately derivative from historical commodity markets. Such spot markets for communication services facilitate buying and selling of network capacity between service providers. Such traded capacity will typically be specified in terms of a source, destination pair (defining a network link), the amount of capacity (bandwidth) traded, and a Grade-of-Service (GoS) parameter. As with all such spot markets, the price of a contract for a given increment of capacity (and a given network link) will vary according to supply and demand conditions at different points in time. By use of such a bandwidth exchange, network service providers can acquire instantaneous bandwidth to make up shortfalls in the provider's installed capacity, as well as to expand its service profile to end users. In like manner, the bandwidth exchange spot market also provides network service providers with a revenue enhancement opportunity through the sale of installed capacity when end-user demand falls below the capacity of the provider's installed network.

The inventors have developed, and hereafter describe, an analytical framework for network capacity management in the presence of a bandwidth exchange market and demand uncertainties. Given a network topology and fixed amounts of installed capacity, the analytical framework of the invention optimizes a network service provider's utility function through the allocation of capacity among end-user demand and bandwidth commerce. The analytical framework of the invention is fundamentally driven by an assessment of the risk-reward relationship and the opportunity cost for a given potential network capacity transaction.

To reflect short-term demand fluctuation, the analytical framework uses random variable distribution functions to formulate offered-loads (i.e., demand) from end users. Consequently, the outcome of a bandwidth management plan developed from the method of the invention will also be a random variable, with the expected value of that variable being defined as the "reward" value for the transaction and the possibility of revenue loss due to demand uncertainty defined as a "risk" value. The risk can usually be characterized by parameters drawn from a distribution, such as moments and standard deviation. While an expected object of every SP is to maximize reward and minimize risk, typically, there are considerable variations among SPs in respect to willingness to take larger risk for more revenue. These difference are accommodated by the method of the invention.

In the course of developing a bandwidth management plan, the invention considers various configurations of a service provider's end-user traffic and bandwidth sold for a given network link as a set of alternatives, specified in terms of revenue derived by the network service provider from the various configurations. Each alternative has an associated reward and risk, and an output of the analytical framework of the invention provides both the total reward and a penalty based on aggregated risk.

Opportunity cost, which is generally well-known in resource allocation problems, refers to the loss of revenue for not serving a demand when the needed capacity is dedicated to another use. It is known that, in network systems, opportunity costs can be expressed as linear combinations of link shadow costs. Although link shadow cost may be determined differently in different network models, conceptually, the shadow cost for a network link can be understood to mean the amount of incremental revenue that can be derived from a marginal increase in bandwidth for the given link. In the method of the invention, link shadow costs are developed and represent a key variable in the allocation of link capacity.

For a preferred embodiment, the analytical framework of the invention is described hereafter in terms of one service provider (SP) interacting with the market for bandwidth. A simplified, but exemplary network environment for application of the analytical framework of the invention is schematically illustrated in FIG. 1. With reference to the figure, and in keeping with the legends shown therein, consider that the SP owns capacity on only 4 physical links, (AB; BC; CD; AD). Consider also that there are pooling points (PP) at A, B, C and E. Thus, SP can be seen as a possible seller of bandwidth on owned links AB, BC and AC, and a possible buyer of bandwidth on links AE, EB, AC, BC, and AB.

A virtual link, as the term is used herein, is defined by a source, destination pair. A demand on a virtual link is typically carried on one or more paths, where each path is constituted of one or more physical links. For instance, the bandwidth that is sold on the virtual link AC may be carried on paths (AB; BC) and (AD; DC). A link on which bandwidth is bought should be considered as a virtual link.

Of course, the amount of bandwidth that the SP sells or buys on a link, if any, depends on the current market buying and selling prices. The market buying/selling prices on tradable links are assumed to be generally available, and are provided as inputs to the invention. (A link is understood to be tradable if a market exists for buying and selling bandwidth on the link)

As illustrated in FIG. 1, the analytical framework of the invention provides the SP an opportunity to extend its view of resources beyond what it has installed and owns, to the extended network which is obtained by augmenting the latter by interconnected links on which bandwidth is traded. Thus, the SP is both able to enhance its revenue by selling excess capacity on its owned network and to potentially improve service to its end users by buying capacity not only on its "footprint" but beyond—i.e., virtual links can be used not only to provide alternative paths and increased capacity between two installed nodes, but also to expand network coverage to provide bandwidth to customers not otherwise serviceable by the provider's owned network.

A key feature of the analytical model of the invention is its capability to handle uncertainty in traffic demands. Those skilled in the art will recognize that the actual traffic demand on a given virtual link is not known with certainty. To accommodate that uncertainty, the method of the invention receives as an input, for each origin-destination pair, the parameters of a statistical demand distribution, rather than a single numerical coefficient. A typical such distribution is obtained by normalizing the restriction of the Gaussian distribution to non-negative values. Such a distribution is referred to herein as a truncated Gaussian distribution. Uncertainty is then accounted for by providing, for example, the variance, or standard deviation, of the distribution.

Figure 2:
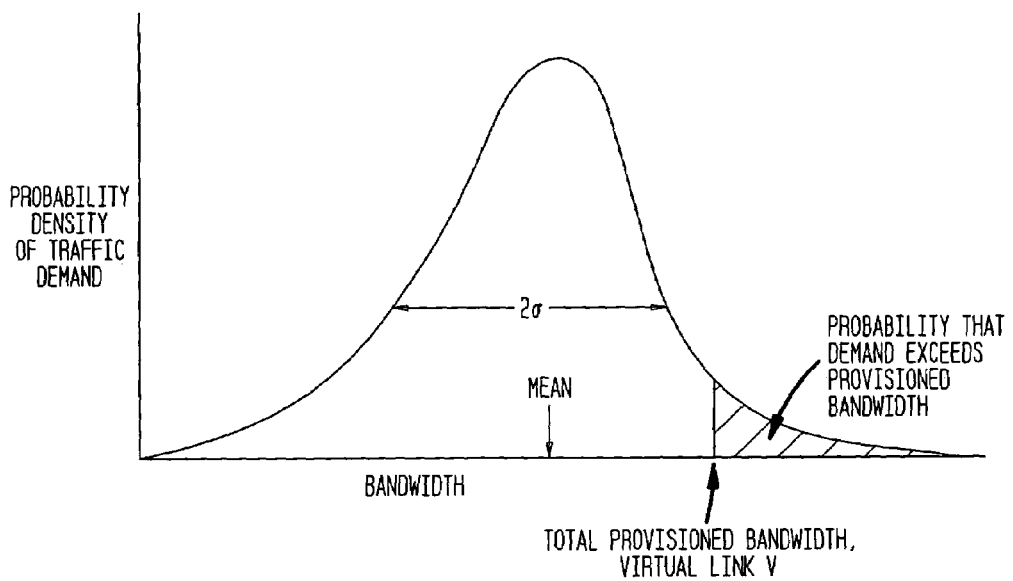
FIG. 2 provides an illustrative depiction of a typical probability density function for predicted traffic demand on a given network link.

An illustrative truncated Gaussian probability density function for predicted traffic demand between a given origin-destination pair is depicted in FIG. 2, with the mean and standard deviation for the function indicated in the figure. The probability that the actual demand will exceed the amount of bandwidth provisioned on the virtual link serving the given origin-destination pair is indicated as the shaded area under the tail of the Gaussian curve. Those skilled in the art will appreciate that the shaded area is readily related to the amount of provisioned bandwidth, and the mean and standard deviation of the distribution. As a consequence, an upper bound on the shaded area is readily imposed by requiring that the provisioned bandwidth be at least a specified linear combination of the mean and standard deviation of the distribution.

Figure 3:
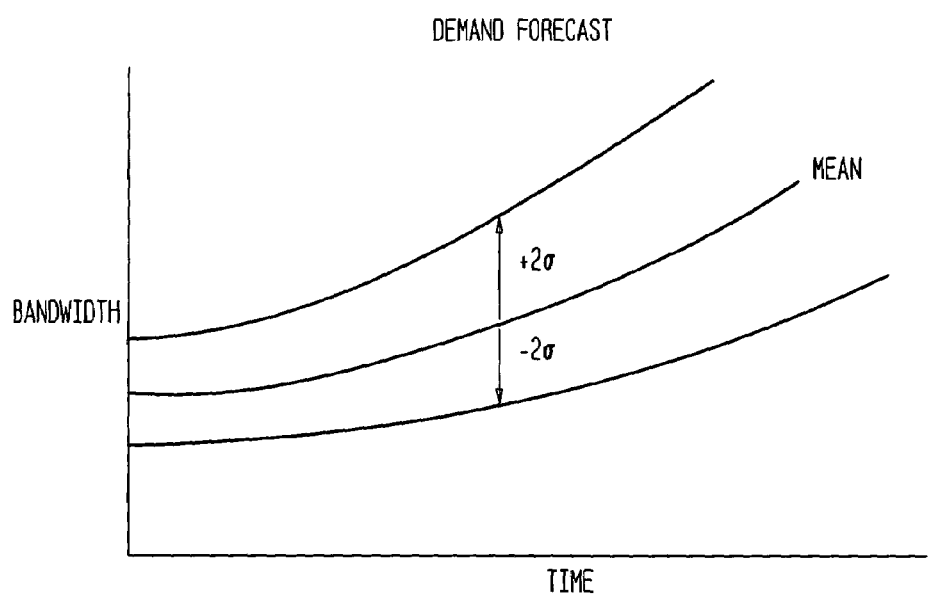
FIG. 3 depicts an exemplary evolution of predicted traffic demand for a given network link.

An exemplary evolution of predicted traffic demand between a given origin-destination pair is illustrated in FIG. 3. As shown in that figure, both the mean predicted demand and the uncertainty in that predicted demand increase over time. Such changes in the uncertainty of the predicted demand are taken into account by the method of the invention.

Figure 4:
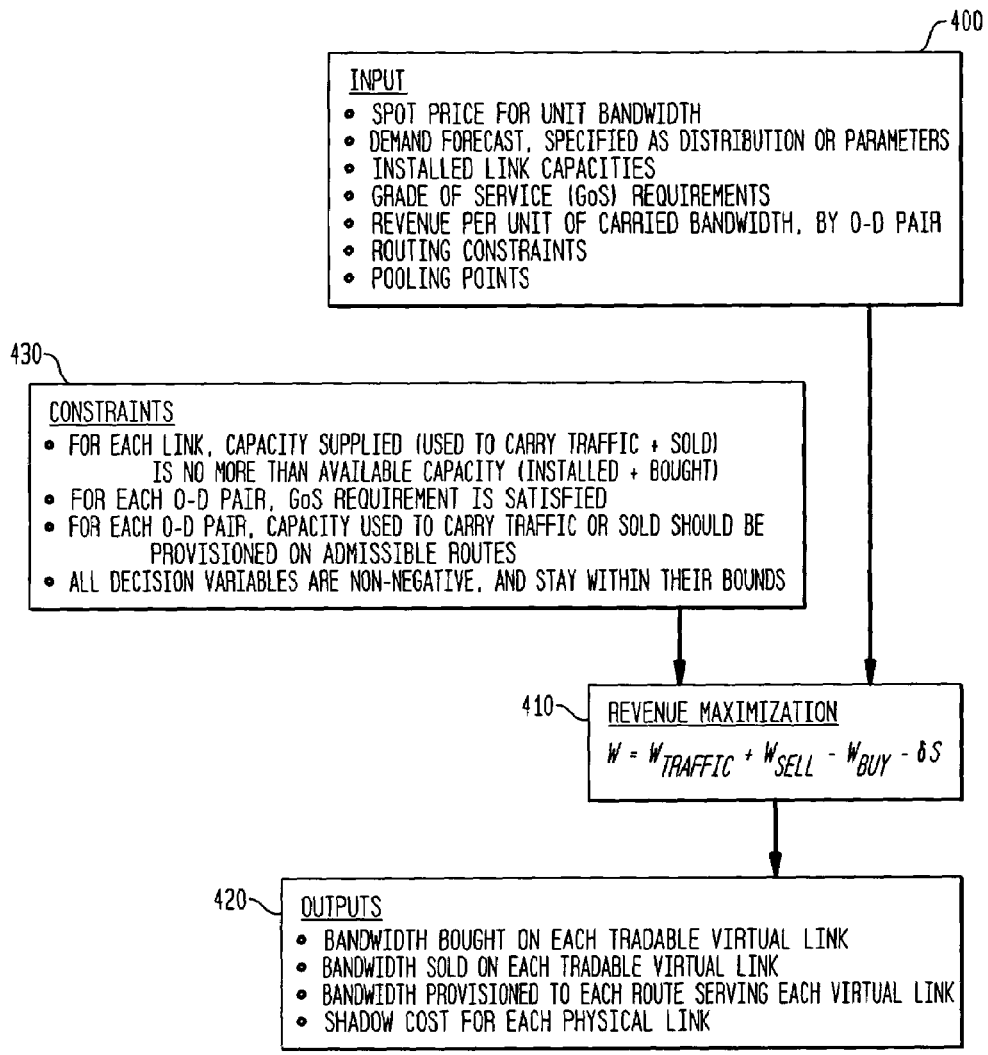
FIG. 4 provides a simplified block diagram illustrating typical inputs and outputs for the methodology of the invention.

With reference now to FIG. 4, the steps of the method of the invention, along with the inputs and outputs for that method are shown in block diagram form. As previously described, inputs to the method of the invention 400 include: (1) spot prices for buying and selling bandwidth; (2) demand forecasts specified statistically either as distributions or parameters; (3) the installed link capacities (as a bandwidth measure);

(4) Grade-of-Service constraints, which would typically constrain blocking probabilities for carried traffic to be above specified levels; (5) expected revenue per unit of bandwidth used to satisfy demand, by origin-destination pair; (6) routing constraints, based on policy, traffic engineering and QoS considerations; and (7) location of pooling points.

With the described inputs, and subject to constraints discussed herein and shown in block 430, the method of the invention operates to optimize combination of revenue and risk for the SP (at 410) as a function of revenue received for traffic carried (in response to random demand), associated uncertainty and possible monetary loss, together with revenue impact from buying and selling bandwidth.

The revenue optimization carried out by the method of the invention at block 410 is in the form of a nonlinear concave maximization problem having linear constraints. There are well-known, standard techniques for solving problems of this class, and any one of such known techniques is intended to be within the scope of the invention. An illustrative such optimization technique is described below in Section VI. In the solution of the optimization problem defined according to the method of the invention, an incremental value of bandwidth is computed for each of the links in the extended network. These incremental values correspond to the link shadow costs as described above. The corresponding notion of a route's shadow cost is the sum of the shadow costs of the links in the route.

With reference again to FIG. 4, after the revenue optimization of the method of the invention is carried out, an output is provided 420 to the SP of: (1) the optimal bandwidth to be bought by the SP for each tradable network link; (2) the optimal bandwidth to be sold by the SP for each tradable network link; (3) the bandwidth that is provisioned to individual routes that carry traffic for each virtual link; and (4) the SP's shadow cost for each physical link.

It is noted that, for the preferred embodiment described herein, the optimization process of the method of the invention is directed to a single unit time period, covering, for example, a specified month of a specified year. (It should, of course, be understood that the described method is equally applicable to substantially smaller or larger periods of time.) Extensions of the described method are, however, within the contemplation of the invention, where, for example, decisions to buy or sell bandwidth on specified virtual links are made for sequences of two or more unit time periods.

As a general rule, nonlinear concave maximization problems with linear constraints are quite tractable. As a consequence, it will generally be practical for the SP to solve the revenue optimization problem according to the method of the invention in real-time, or almost real-time.

An advantage offered to service providers by the availability of bandwidth commerce according to the method of the invention is that the SP can invest in physical capacity according to the most probable traffic patterns, but also has the ability to purchase capacity to accommodate extraordinary traffic demands that have low probability of occurrence. That is, the SP can build for the mean and purchase for the tail of the probability distribution of traffic demand. Correspondingly, the SP also has the ability to sell excess capacity should the actual demand fall short of its projected mean.

In the following sections, a formulation of the computational steps contemplated by the methodology of the invention is presented. As will be seen, various mathematical relations and tools are used throughout that presentation to the end of providing a more concise and compact formulation of the analytical framework of the invention. That presentation begins with a brief description of the notation employed in describing those computational steps. It is to be noted, however, and should, as well, be clear to those skilled in the art, that, while the described mechanisms and relations are used in the course of the various operating steps of the invention, both the input to the method of the invention, and the output of that methodology, are constituted in real, practical parameters and/or applications used and useful in the art of network/bandwidth management.

I. Notation

A. Network Nodes and Links

Let G=(N; L) be the network graph of nodes (N) and links (L) corresponding to the installed capacity of the SP. Let $G_B=(N_B; L_B)$ be the nodes ($N_B$) and links ($L_B$) with buyable capacity. The representation of a virtual link is $v=(v_1; v_2)$ (source, destination).

The set of virtual links with possible demands are represented as:

$V_{01}=\{v|v_1 \epsilon N \cup N_B, v_2 \epsilon N \cup N_B\}$ i.e., this is the set of virtual links with sources and destinations in the extended network.

$V_D=\{v|$ virtual links with capacity for sale by the SP$\}$ $V_B=\{v|$ virtual links with capacity that is buyable by the SP$\}$ The set of provisionable links l (physical and virtual) in the extended network is represented as: $L_{ext}=L \cup V_B$. Note that it is not necessary to recognize the distinction between links l in L, which is physical, and l in $V_B$, which may be either a direct link or a path composed of possibly several constituent links.

B. Capacity

Installed capacity in link l(l∈L) is indicated by $C_l$. Bought capacity on virtual link $v(v \epsilon V_B)$ is indicated by $B_v$. Total capacity on link l ($l \epsilon L_{ext}$) is:

$C_l=C_l I(l \epsilon L)+B_v I(v \epsilon V_B$ and l is the direct linkconnecting v)

where I(x) is an indicator function: I(x)=1 if its argument x is true and I(x)=0 if x is false.

Note that there may of course be links that are in L as well as in $V_B$, such as link BC in FIG. 1.

A constraint on the amount of capacity that can be bought is indicated as:

$_v \leq \overline{B}_v (v \epsilon V_B)$. Note that $B_v=+\infty$ connotes that there is no limit of supply in the bandwidth market.

The capacity sold on virtual link $v(v \epsilon V_D)$ is designated as $D_v$.

C. Bandwidth Price

SP earns $e_v$ for carrying unit bandwidth on virtual link $v(v \epsilon V_{01})$. SP earns $p'_v$ per unit bandwidth that it sells on virtual link $v(v \epsilon V_D)$. SP pays $p''_v$ per unit bandwidth that it buys on virtual link $v(v \epsilon V_B)$.

Note that there may be links, such as BC in FIG. 1, in which the SP is both a potential buyer and a seller. In this case, the unit selling price, $p'_v$ is constrained to be less than the unit buying price, $p''_v$. This inhibits fictitious sales. The unit selling price can also be characterized as a "wholesale" price and the unit buying price as a "retail" price. As will be apparent, the wholesale price would always be less than the retail price in any rational market.

II. Traffic Demand

As discussed above, the actual traffic demand on virtual link $v (v \in V_{01})$ is not known with certainty. This traffic demand, or offered traffic, is modeled by a nonnegative random variable $T_v$, $T_v$ has the density function $q_v(.)$ and the cumulative distribution $Q_v(.)$. Thus $$Pr[T_v > t] = \int_t^\infty q_v(s) ds = Q_v(t) \quad (0 \le t \le \infty) \tag{1}$$

Based on the truncated Gaussian distribution used for the illustrative embodiment described herein:

$$q_v(s) = \frac{1}{\sqrt{2\pi}\, \omega_v G_v} e^{-\frac{1}{2}(s-u_v)^2/\omega_v^2} \quad (0 \le s \le \infty) \tag{2}$$

where $(u_v, \omega_v^2)$ are parameters of the Gaussian distribution. It follows that the mean and variance of the (offered) traffic demand for the virtual link v is, $$m_v = E(T_v) = u_v + \frac{\omega_v}{G_v \sqrt{2\pi}} e^{-u_v^2/2\omega_v^2} \tag{3}$$

$$\sigma_v^2 = \text{Var}(T_v) = \omega_v^2 \left[ 1 - \left( \frac{e^{-u_v^2/2\omega_v^2}}{\sqrt{2\pi}\, G_v} \right)^2 - \frac{u_v}{\sqrt{2\pi}\, \omega_v G_v} e^{-u_v^2/2\omega_v^2} \right] \tag{4}$$

$$\text{where } G_v = \frac{1}{\sqrt{2\pi}\, \omega_v} \int_0^{+\infty} e^{-\frac{1}{2}(t-u_v)^2/\omega_v^2} dt = \frac{1}{2} \text{erfc}\left( -\frac{u_v}{\sqrt{2}\, \omega_v} \right) \tag{5}$$

and erfc(.) is the complementary error function.

III. Mean and Variance of Carried Traffic and Loss

In Section II above, the idea of a random (offered) demand on a virtual link v was introduced. Here, the average amount of bandwidth used to carry demand is considered. This quantity is easily obtained from the mean traffic that is lost, on the virtual link, when the provisioned capacity for the virtual link is $\xi$, a deterministic quantity.

Let L denote the random amount of bandwidth that is lost. (The subscript v, which indexes the virtual link, is dropped in this section)

$$L = 0 \text{ if } T \le \xi; = (T - \xi) \text{ if } \xi < T \tag{6}$$

Then, $$E(L) = \int_\xi^\infty Q(t) dt \tag{7}$$

For the case of general distributions, computing a very large number of such integrals would be burdensome. However, in the case of the truncated Gaussian distribution this integral can be computed explicitly. For $q(.)$ and $Q(.)$ given as in Equations (1) and (2) above, $$E(L) = \frac{1}{G} \left[ -\frac{(\xi - u)}{2} \text{erfc}\left( \frac{\xi - u}{\sqrt{2}\, u} \right) + \frac{\omega}{\sqrt{2\pi}} e^{-\frac{1}{2}(\xi - u)^2/\omega^2} \right] \tag{8}$$

Hence, the mean used bandwidth on this virtual link, $$= \text{mean offered bandwidth} - E(L) = m - E(L); \tag{9}$$

where m is given in Equation (3).

Now note from Equation (7) that in the case of generally distributed T, $$\frac{\partial E(L)}{\partial \xi} = -Q(\xi) < 0 \tag{10}$$

and $$\frac{\partial^2 E(L)}{\partial \xi^2} = q(\xi) > 0 \tag{11}$$

That is, E(L) is convex and monotonically decreasing in the provisioned capacity $\xi$. Thus, the mean carried traffic is concave and monotonically increasing in $\xi$. Alternatively, one can define M as the amount of bandwidth used to carry (random) demand traffic:

$$M = T \text{ if } T \le \xi; = \xi \text{ if } \xi < T \tag{12}$$

It then follows that $$E(M) = -\int_0^\xi t\, dQ(t) dt + Q(\xi)\xi = \int_0^\xi Q(t) dt = m - E(L) \tag{13}$$

which is the same as in (9). Furthermore, the variance of random amount of bandwidth carried on the virtual link, Var(M), can be calculated by noting that:

$$E(M^2) = -\int_0^\xi t^2\, dQ(t) dt + Q(\xi)\xi^2 = 2\int_0^\xi tQ(t) dt \tag{14}$$

so $$\text{Var}(M) = E(M^2) - ([E(M)])^2 = 2\int_0^\xi tQ(t) dt - \left( \left[ \int_0^\xi Q(t) dt \right] \right)^2 \tag{15}$$

$$\frac{\partial \text{Var}(M)}{\partial \xi} = 2Q(\xi) \left( \xi - \int_0^\xi Q(t) dt \right) = 2Q(\xi) \int_0^\xi [1 - Q(t)] dt \ge 0 \tag{16}$$

That is, the variance increases with $\xi$.

IV. Reward and Risk

Reward is represented by mean revenue earned, which the SP wishes to maximize. Risk, which the SP wants to minimize, is defined as the possibility of revenue loss due to demand uncertainty, characterized by parameters such as moments of distribution and standard deviation. From the SP's perspective, the appropriate objective is to maximize a weighted combination of reward and risk—that is, to maximize:

mean revenue−δ* standard deviation where δ can be viewed as the penalty imposed on each unit of risk. Also δ can be viewed as an indicator of the degree to which the SP is risk-averse.

The mean revenue is herein denoted by W, and has 3 distinct components, $$W_{traffic}, W_{sell}, \text{ and } W_{buy}, \text{ i.e.: } W = W_{traffic} + W_{sell} - W_{buy}; \quad (17)$$

where $W_{traffic}$ is the mean revenue earned from carrying traffic, $W_{sell}$ is the (deterministic) amount earned from sale of bandwidth and $W_{buy}$ is the (deterministic) amount paid out for the bought bandwidth. These revenue components depend on the unit bandwidth price parameters $e_v (v \in V_{01})$, $p'_v (v \in V_D)$ and $p''_v (v \in V_B)$ introduced in Section I.C. above.

The $W_{traffic}$ component is developed as:

$$W_{traffic} = \sum_{v \in V_{01}} e_v [m_v - E(L_v)] \quad (18)$$

where, $E(L_v)$ is the expected bandwidth loss on the virtual link v, which is given in Equation (8) for the generic virtual link. In Equation (18), $m_v$ is the mean offered traffic, and therefore $[m_v - E(L_v)]$ is the mean carried traffic on which revenue is earned.

The remaining revenue components follow directly:

$$W_{sell} = \sum_{v \in V_D} p'_v D_v = \sum_{v \in V_D} p'_v \sum_{r \in R(v)} \xi_r, \quad (19)$$

and $$W_{buy} = \sum_{v \in V_B} p''_v B_v \quad (20)$$

Note that $W_{traffic}$ is a concave function of $(\xi_r)$, a consequence of the definitions in Equations (18) and (11). $W_{sell}$ and $W_{buy}$ are linear functions of $\{D_v\}$ and $\{B_v\}$ respectively.

The standard deviation of the total revenue is herein denoted by S. Note that S is only related to revenue earned from carrying traffic, since the revenue impact from buying and selling bandwidth is deterministic. From equation (15):

$$S = \sqrt{\sum_{v \in V_{01}} e_v^2 \left\{ \int_0^{\xi_v} 2t Q(t) dt - \left( \left[ \int_0^{\xi_v} Q(t) dt \right] \right)^2 \right\}} \quad (21)$$

As can be seen from Equation (16), S increases with all $\xi_v$.

V. Traffic Engineering: Admissible Routes, QoS Requirements

For each (source, destination), $v = (v_1, v_2)$, there are possibly several routes r which define the set of admissible routes R(v). [The concept of admissible routes is explored in depth by two of the inventors in Mitra and Ramakrishnan, "A Case Study Of Multiservice, Multipriority Traffic Engineering Design For Data Networks," Globecom Telecommunications Conference—Globecom 1999, pp 1077–1083, that study being incorporated by reference herein.] Each of the admissible routes is a candidate for carrying traffic from $v_1$ to $v_2$, and is assumed to satisfy diverse requirements arising from policy and QoS.

The bandwidth that is provisioned on route r is herein denoted by $\xi_r$. Thus, the total bandwidth provisioned for the virtual link v, is $$\xi_v = \sum_{r \in R(v)} \xi_r \quad (22)$$

In addition, it is considered reasonable to impose certain Grade-of-Service requirements as an input parameter to the method of the invention. Otherwise, end-user customers could be subject to unacceptable levels of blocking in the services received. For each $(v \in V_{01})$, that Grade-of-Service requirement is:

$$\xi_v \geq \alpha m_v + \beta \sigma_v \quad (23)$$

where $\alpha$ and $\beta$ are fixed Grade-of-Service parameters, and $(m_v; \sigma_v^2)$ are the mean and variance of the offered traffic. The requirement that the provisioned bandwidth be bounded from below by a linear combination of the mean and standard deviation is established to guarantee that the blocking probability, i.e., the loss fraction, on the virtual link is upper bounded as desired. That is, a Grade-of-Service requirement on the blocking probability, $Pr[T_v > \xi_v] < \epsilon$, can be easily translated into Equation (23).

VI. The Optimization Problem

Given the inputs and constraints described above, the method of the invention then proceeds to maximize revenue, W. Stated algebraically:

$$\max_{\{\xi_r\}, \{B_v\}} W - \delta * S \quad (24)$$

$$\text{Capacity constraints: } \sum_{v \in V_{01}} \sum_{r \in R(v) | l \in r} \xi_r + \sum_{v \in V_D} \sum_{r \in R(v) | l \in r} \xi_r \leq C'_l \quad (l \in L_{ext}) \quad (25.\text{i})$$

$$\text{Grade-of-Service constraints: } \sum_{r \in R(v)} \geq \alpha m_v + \beta \sigma_v \quad (v \in V_{01}) \quad (25.\text{ii})$$

$$\text{Constraint on bought amount: } B_v \leq \overline{B}_v \quad (v \in V_B) \quad (25.\text{iii})$$

$$\text{Nonnegativity: } \xi_r \geq 0 (\forall r), B_v \geq 0 (\forall v), D_v \geq 0 (\forall v)$$

where $C_l$ is the total link capacity, as defined above in Section I.B.

In order to maximize the expected revenue (i.e., reward) $W=W_{traffic}+W_{sell}-W_{buy}$, the goal would be to maximize the sum of the revenue for traffic carried ($W_{traffic}$) and revenue for capacity sold ($W_{sell}$), while minimizing the revenue paid out for capacity bought from others ($W_{buy}$). Thus, in principle, the SP would provision as much capacity as possible to owned routes ($\xi_r$) in a link, and correspondingly would try to minimize the amount of capacity in the link ($B_v$) obtained from others. However, the flexibility of the SP to set these values is limited by the constraints described above (see equations (25.i)–(25.iii)).

Furthermore, to assign larger values to $\xi_r$ will also result in increased risk, since, as shown above, the standard deviation, S, increases with $\xi_r$. Therefore, in order to achieve a balanced approach of maximizing reward (expected revenue) and minimizing risk (standard deviation) in respect to capacity allocation in a link, the SP will utilize the method of the invention to find the best values for capacity to be bought ($B_v$) in routes provisioned by others ($\xi_r$) within the region of feasibility.

It is to be noted that the objective function, $W-\delta*S$, is non-decreasing with decision variables, $\{\xi_r\}$ and $\{B_v\}$, in a specific closed region. Within that region, the function is concave. Also, all the constraints in Equation (25) are linear in the decision variables. This optimization problem is an element of the class of concave programming problems, which is a class that is well known to have attractive tractability and very effective algorithms for the solution.

In an illustrative embodiment, the optimization algorithm used is a Sequential Quadratic Programming (SQP) approach (as described by, for example, P. T. Boggs, and J. W. Tolle, *Sequential Quadratic Programming*, Acta Numerica, Cambridge University Press, Cambridge, UK, 1995). The SQP starts with an initial solution that satisfies all constraints, and calculates the first and second order derivatives of the objective function with respect to every variable at the starting point. The original objective is approximated by a quadratic function, which is determined by the aforementioned derivative values. Maximizing this approximating quadratic objective function under linear constraints (those in equations 25.i –25.iii) is a quadratic programming problem, which is the simplest instance of nonlinear optimization. The optimal solution to the quadratic programming model can be considered as the point that sets the direction for improvement—consider it as the "target" point. A middle point between the starting point and the target point is calculated as:

$$(1-\psi)*\text{starting point}+\psi*\text{target point}$$

where $\psi$ is a weight parameter, obtained by searching through the interval [0,1] so that the middle point 1) satisfies all constraints, and 2) maximizes the original objective function, W. This middle point is then made the new start pointing and the process of formulating and solving the approximating quadratic programming model is repeated, finding a new middle point. The fact that the problem is a nonlinear concave maximization model ensures that the iteration will converge to the global optimal solution.

The illustrative embodiment of the invention described herein is directed to a single class of service. However, those skilled in the art would appreciate that the principles described here are readily extended to a number of service classes, each having its own QoS constraints, and its own revenue parameters. For example, a class of "conventional" traffic might be routed only on links owned by the service provider, while a second-class traffic might be subject to bandwidth commerce according to the method of invention.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention and the exclusive use of all modifications which come within the scope of the appended claims is reserved.

The invention claimed is:

1. In a communications network having a plurality of nodes, wherein pairs of said nodes are connected by one or more physical paths, each said path including one or more connected links, and wherein ownership of said links is divided among a plurality of entities and a market mechanism is provided for buying and selling of link capacity among said entities, a method for capacity management in said network by a given entity comprising the steps of:
   receiving at least two input parameters, said input parameters including a node-pair revenue parameter and a node-pair demand parameter;
   determining an expected revenue value for traffic offered for carriage by said given entity between a given node-pair, as a function of said node-pair revenue parameter and said node-pair demand parameter;
   in the event that said traffic offered for carriage between said given node-pair exceeds an available capacity of links owned by said given entity between said given node-pair, determining a provisional allocation of said offered traffic between capacity owned by said given entity and capacity owned by other entities;
   optimizing an objective function relating expected revenue and associated risk factors for said offered traffic and cost for said capacity owned by other entities, given alternative allocations of capacity between said given node-pair among links owned by said given entity and links owned by said other entities; and
   selecting a capacity allocation between said given node-pair that maximizes a weighted combination of expected revenue and risk.

2. The capacity management method of claim 1 wherein said node-pair revenue parameter is constituted as a revenue increment corresponding to carriage between said node-pair of a unit of bandwidth.

3. The capacity management method of claim 2 wherein said unit bandwidth revenue parameter is separately constituted for traffic carried by said given entity and for capacity obtained from said other entities.

4. The capacity management method of claim 1 wherein said node-pair demand parameter is constituted as a probability distribution function.

5. The capacity management method of claim 4 wherein said probability distribution function is a truncated Gaussian distribution.

6. The capacity management method of claim 1 wherein said receiving step further receives as an input a Grade-of-Service parameter, and said Grade-of-Service parameter operates as a constraint on capacity that can be allocated for a given path.

7. The capacity management method of claim 1 including the further steps of provisionally allocating capacity in links owned by said given entity for sale to said other entities, and incorporating a revenue contribution factor for said sold capacity in said objective function of said optimizing step.

8. The capacity management method of claim 7 wherein said node-pair revenue parameter is separately constituted as a first unit bandwidth revenue parameter for traffic carried by said given entity, a second unit bandwidth revenue parameter for capacity sold to said other entities, and a unit bandwidth cost parameter for capacity obtained from said other entities.

9. The capacity management method of claim 1 further applied to a plurality of said network node-pairs.

10. The capacity management method of claim 1 further including, as an output, a shadow cost for said given network node-pair.

* * * * *